(12) United States Patent
Miller

(10) Patent No.: US 6,308,265 B1
(45) Date of Patent: Oct. 23, 2001

(54) PROTECTION OF BOOT BLOCK CODE WHILE ALLOWING WRITE ACCESSES TO THE BOOT BLOCK

(75) Inventor: Gregory L. Miller, Portland, OR (US)

(73) Assignee: Phoenix Technologies Ltd., San Jose, CA (US)

( * ) Notice: Subject to any disclaimer, the term of this patent is extended or adjusted under 35 U.S.C. 154(b) by 0 days.

(21) Appl. No.: 09/163,360

(22) Filed: Sep. 30, 1998

(51) Int. Cl.$^7$ .................................................. G06F 15/177
(52) U.S. Cl. .............................. 713/2; 710/10; 711/162; 714/6
(58) Field of Search .............................. 713/2, 1; 710/10; 714/6, 15; 711/162

(56) References Cited

U.S. PATENT DOCUMENTS

| | | | |
|---|---|---|---|
| 5,269,022 | * 12/1993 | Shinjo et al. | 395/700 |
| 5,568,641 | * 10/1996 | Nelson et al. | 395/700 |
| 5,918,047 | * 6/1999 | Leavitt et al. | 713/2 |
| 5,960,445 | * 9/1999 | Tamori et al. | 707/203 |
| 5,960,460 | * 9/1999 | Marasco et al. | 711/162 |
| 5,974,544 | * 10/1999 | Jeffries et al. | 713/1 |
| 6,018,629 | 1/2000 | Tojima | 395/712 |

FOREIGN PATENT DOCUMENTS

| | | |
|---|---|---|
| 0 723 226 | 7/1996 | (EP) . |
| 0 803 812 | 10/1997 | (EP) . |

* cited by examiner

*Primary Examiner*—Thomas Black
*Assistant Examiner*—Mary Wang

(57) ABSTRACT

An apparatus and a method for protecting boot block code while allowing updating to BIOS code during a flash BIOS operation. The boot block code is stored in a boot block or boot region of a flash part, and then a copy of the boot block code is written into another region of the flash part. The image of the boot block code in the another region is compared with the boot block code in the boot block, and if there is a match, the boot block region is unprotected, thereby allowing an update of code in the boot block. The boot block code of the flashed-in BIOS image in the boot block region is compared with the copy of the boot block code in the another region, and if there is a match, the code in the boot block region is protected. If there is not a match or if a power failure occurs, the system is booted up using the boot block code in the another region.

19 Claims, 3 Drawing Sheets

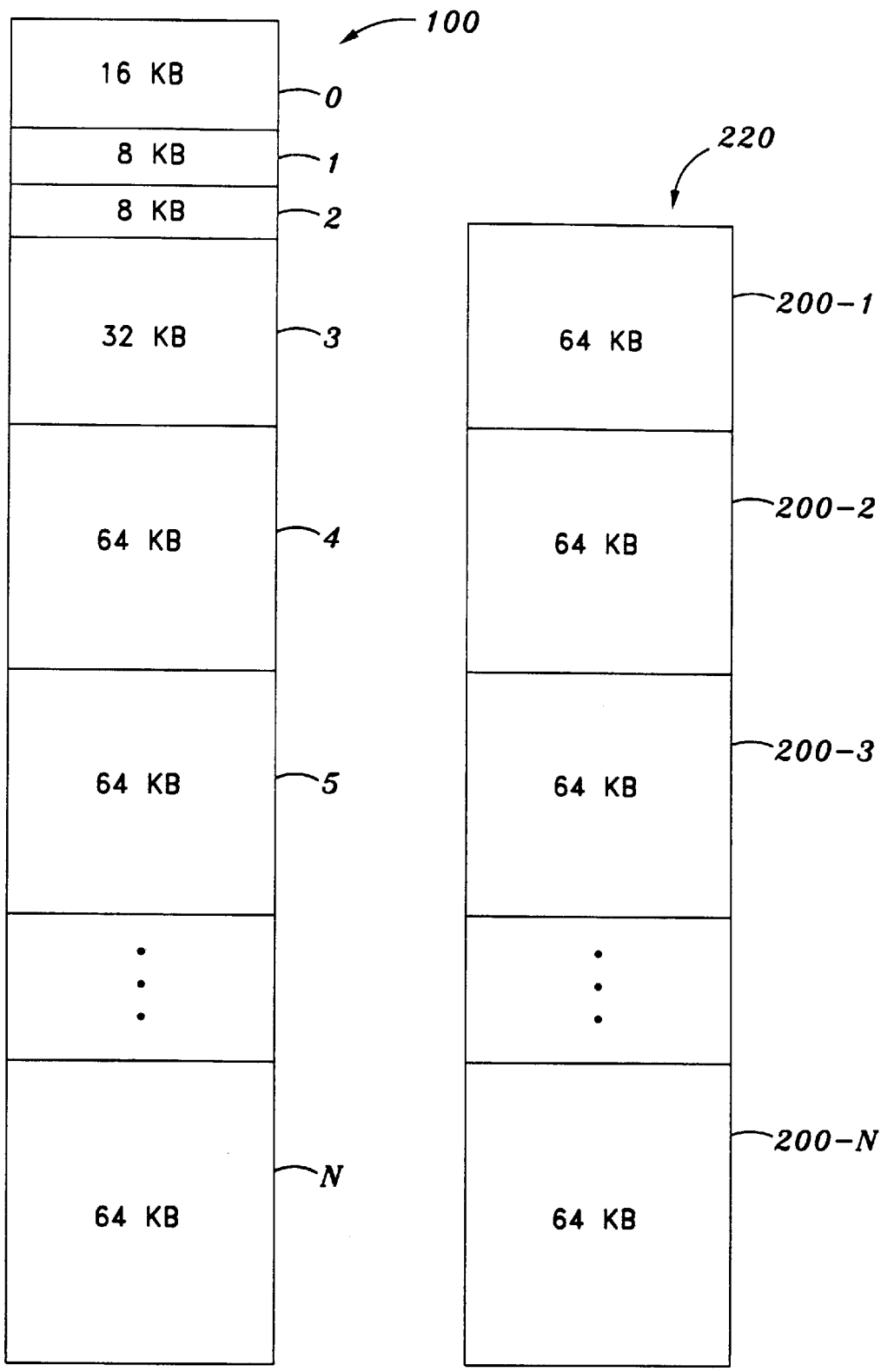

PROTECTION OF BOOT BLOCK CODE WHILE ALLOWING WRITE ACCESSES TO THE BOOT BLOCK

BACKGROUND OF THE INVENTION

1. Field of the Invention

The present invention relates to the protection of the boot block or the BIOS recovery region, while allowing write accesses to that same region. In particular, the present invention relates to the preservation of certain code or data within a "protected" segment, while also allowing for updates of other code that is also stored in the same segment.

2. Description of the Related Art

When a computer, such as a personal computer (PC), is switched off, the computer typically loses the contents of its working main memory that it accesses. When the computer is restarted, or booted up, all drives and components accessed by the PC have to be reinitialized.

This reinitialization is performed by the Basic Input/Output System, or BIOS. The BIOS includes system programs for the basic input and output operations, and provides the software interface to the PC hardware. Typical BIOS functions provide access to the floppy disk, hard disk drives, interfaces, and graphics adapters. A nonvolatile storage (NVRAM), usually a EPROM/Flash RAM, stores the BIOS for use by the CPU.

Random access memory (RAM), including the NVRAM discussed above and the central processing unit (CPU), are included on the motherboard. The CPU is connected to a keyboard, by which a user enters data or commands. To display such inputs visually, the CPU is also connected to a graphics adapter, which accepts the data to display, and processes the data so that it can be displayed on a monitor or display.

The motherboard also includes memory that stores programs and data that the PC needs at power-up, because the PC loses the contents of its main memory when it is powered down. The CPU reads the programs in the memory, and executes them at power-up. In the memory there are various support routines for accessing the keyboard, the graphics adapter, etc., which are collectively known as the ROM-BIOS or BIOS, noted previously.

Graphics adapter cards typically have their own ROM-BIOS, by which the CPU on the motherboard calls the corresponding program in the ROM-BIOS of the graphics adapter card via a bus interface (e.g., RS-232C).

When it becomes necessary to add support for a new feature, functionality or just fix a bug, most systems allow one to "flash" the BIOS, so as to allow for an updated BIOS to be written into the PC's NVRAM. Once the BIOS is flashed, the PC uses the updated BIOS, which has now been written over the older BIOS.

Upon reset, the PC starts executing a block where the boot block code resides. In most systems, the region containing the boot block area is write protected and cannot be overwritten, and provides the code that the PC executes upon power up or reset. The boot block code typically ranges from about 8 Kbytes up to 32 Kbytes. It is a subset of the BIOS and is sufficient to read the floppy drive, and write to the flash part. The boot block code can be considered to be a self-contained "miniBIOS" with enough code so as to read the new BIOS image off a floppy or the like, and write that image to the flash part.

The boot block code in conventional PCs is protected from overwriting. Motherboard manufacturers, in general, do not provide a means for erasing the boot block region in order to protect the integrity of the recovery code. Conventional flash parts or memories are non-symmetrical, in a sense that they are designed with different-sized segments. Data is written into such memories on a segment-by-segment basis. For example, there may be two 8-Kbyte segments, one 16-Kbyte segment, one 32-Kbyte segment, and a plurality of 64-Kbyte segments. One of the 8-Kbyte segments may contain information on the manufacturer (e.g., name of manufacturer, model number of PC, etc.). The 16-Kbyte segment may contain the protected boot block code, and the other segments contain other data, such as updatable BIOS code or the like. Data in a segment can only be updated by erasing the entire contents of the segment to create a blank segment (e.g., all "0's"), and then by writing new data into the blank segment.

The means for accessing any particular segment of a memory is known to those of ordinary skill in the art. For example, one way of accessing a particular segment for rewriting is for the user to provide a special erase command byte to any address location in the particular segment that is to be updated. This special erase command byte is provided at the same time a Write Enable pin of the memory is enabled, such as by providing the proper voltage Vpp (5 volts or the like) to that pin. Once this has been performed, the particular segment is erased. A similar process is then performed to allow a writing to the particular segment (e.g., providing a special write command byte to the particular segment while enabling the Write Enable pin). Other ways of selecting a particular segment of memory for erasing and rewriting are known, and vary from manufacturer to manufacturer.

The 16-Kbyte segment containing the boot block code in the example described above is typically not available for updating (e.g., erasing and rewriting). The purpose of the boot block code in the 16-Kbyte segment that holds it is that, in a case where a BIOS image is updated (flashed) and power is lost during that process, the BIOS image that is read may be bad. In that case, if one tried to boot from the bad BIOS image, the user would not be able to do so due to the faulty BIOS image. However, by having recovery code present in the boot block that cannot be overwritten, the boot block code, which is executed every time the PC is powered up, includes code to determine whether the BIOS image is bad. If the BIOS image is correct, then the boot block code will skip recovery process code incorporated therein, and will allow control to be passed to the BIOS image so as to allow the BIOS image to be executed.

If the BIOS image is bad, which can be determined during execution of the boot block code by the performance of a simple check sum on the BIOS image, for exanple, then the boot block code will not allow the BIOS image to be executed. Instead, it will execute a recovery process. In the recovery process, the BIOS image will be rewritten, such as by the boot block code retrieving a BIOS image stored in a floppy disk inserted into a disk drive of the PC. The boot block code then checks the updated BIOS image and proceeds as explained above.

Nonsymmetrical flash parts or memories are typically more expensive to manufacture than symmetrical flash parts. That is, a flash part having only multiple 64-Kbyte segments is cheaper to manufacture than a flash part having multiple 64-Kbyte segments, one or more 16-Kbyte segments, and one or more 8-Kbyte segments. However, since the boot block code cannot be overwritten, having a 16-Kbyte segment that can be provided for just the boot block code (which typically is around 16 Kbytes in size) is useful, since that way no wasted memory space occurs.

In particular, since the boot block code cannot easily be erased and then rewritten, if the boot block code was provided in a larger segment, such as a 64-Kbyte segment, then that segment would also have to include other code that cannot be erased and then rewritten so as to make maximum utilization of the available memory space. Alternatively, the remaining space of the 64-Kbyte boot block segment could remain blank and thus unutilized. Thus, if the boot block code was 16 Kbytes in size, then the other 48 Kbytes of the 64 Kbyte boot block segment would either have to be unutilized (e.g., blank), or provided with code that cannot be updated.

In a sense, the boot block code may be considered to be the non-updatable portion of the BIOS code. The BIOS code that is updatable is typically placed contiguously with the non-updatable boot block code. While there may be portions of the BIOS code that are not updated very often, such as information on video drivers or logos to be displayed at power up, it may be desirable to update even that code from time to time. However, this is not a problem with asymmetrical flash parts, in which the boot block segment is sized to hold the boot block code, and not much else.

SUMMARY OF THE INVENTION

An object of the present invention is to provide a method for protecting the flash recovery code that formerly resides in a protected boot block segment of a non-symmetrical flash part.

The above-mentioned object and other advantages of the present invention may be achieved by a method of protecting boot block code while allowing an update to other code or data residing in the same block. The boot block code and the other code or data are stored in a first writable segment of a flash memory that is usually set to a protected non-writable state. The method includes a step of copying all data stored in the first writable segment of the memory into a second writable segment of the memory. The method also includes a step of validating the copied data in the second writable segment of the memory. The method further includes a step of setting the first writable segment to a non-protected, writable state. The method still further includes a step of erasing all data stored in the first writable segment. The method also includes a step of updating the first writable segment with updated code or data, the updated code or data including boot block code. The method further includes a step of comparing the boot block code stored in the first writable segment with the boot block code stored in the second writable segment. If the comparison is such that the boot block codes stored in the first and second rewritable segments are identical, the method includes a step of setting the first rewritable segment to the protected, non-writable state.

The above-mentioned object and other advantages may also be achieved by an apparatus for providing protection for boot block code used to boot up a computer. The apparatus includes a segmented memory having a plurality of writable segments, one of the segments being a segment in which the boot block code is stored, another of the segments being a segment in which a copy of the boot block code is stored. The apparatus also includes a storage element for storing a state of a flag, the state being indicative of whether the boot block code is to be executed from the one of the segments or from the another of the segments when the boot up of the computer is performed.

BRIEF DESCRIPTION OF THE DRAWINGS

The above-mentioned objects and advantages of the invention will become more fully apparent from the following detailed description when read in conjunction with the accompanying drawings, with like reference numerals indicating corresponding parts throughout, and wherein:

FIG. 1 shows a configuration of an asymmetrical flash part used to store boot block code for conventional PCs;

FIG. 2 shows a configuration of a symmetrical flash part that can be used to store boot block code according to the present invention;

DETAILED DESCRIPTION OF THE PREFERRED EMBODIMENT

Figure 3:
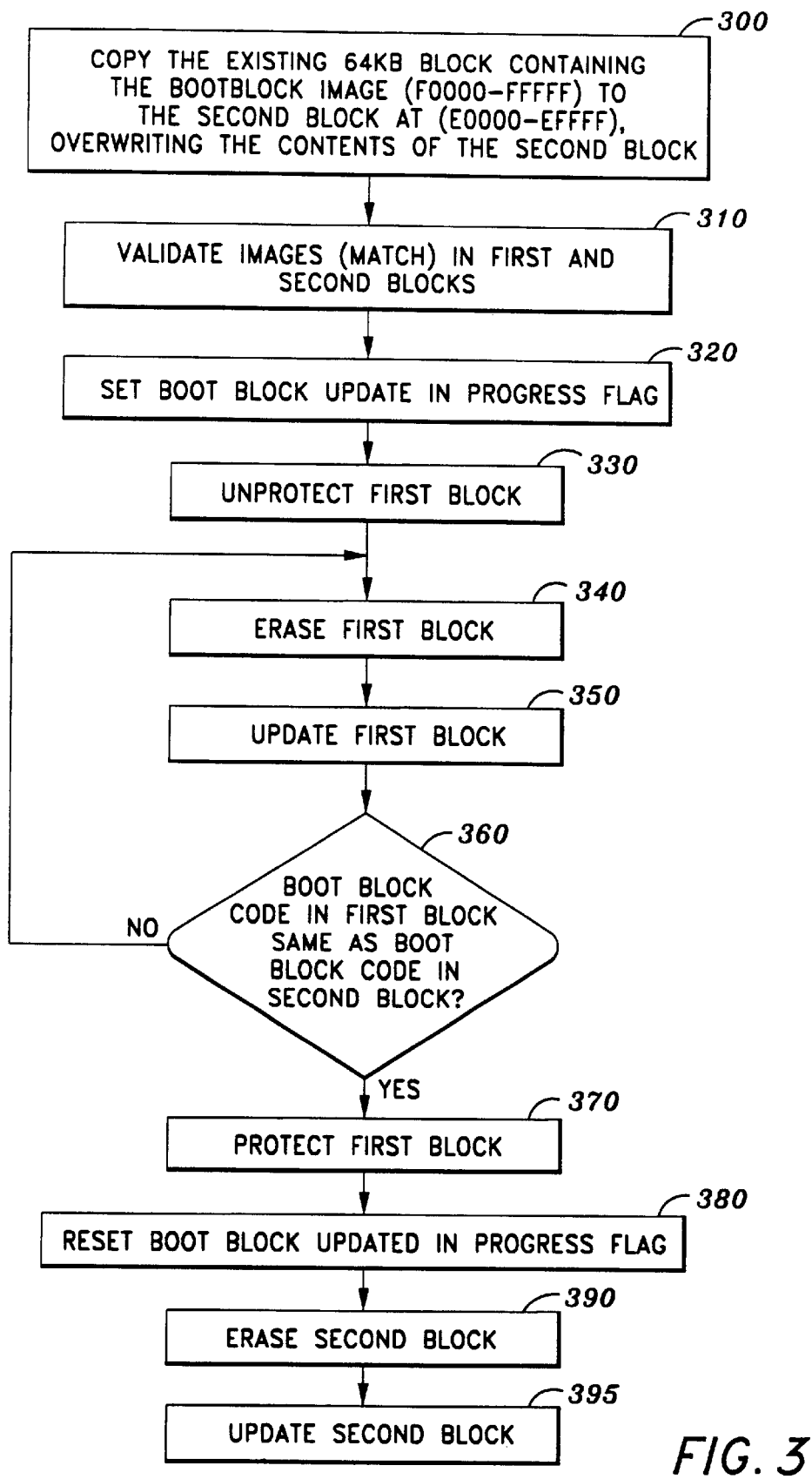
FIG. 3 is a flow chart of a method of protecting boot block code while allowing updating of BIOS code according to the present invention.

The present invention will be described in detail below in connection with the accompanying figures. FIG. 1 shows the configuration of an asymmetrical flash part that is used in conventional PCs to hold the boot block code and other code or data, such as rewritable BIOS code. In FIG. 1, the boot block code is stored in a segment 0 of an asymmetrical flash memory 100. The segment 0 has a storage capacity of 16 Kbytes. The segment 0 is locked down or protected, and cannot be overwritten after the boot block code has been written into the first segment 0 at manufacture of the asymmetrical flash memory 100. That way, the boot block code's integrity is preserved at all times.

FIG. 1 also shows another segment 1 of the asymmetrical flash memory 100. The segment 1 has a storage capacity of 8 Kbytes. FIG. 1 further shows yet another segment 2 having a storage capacity of 8 Kbytes. Manufacturer-specific information (e.g., logo, name of manufacturer, etc.) is typically stored in the third segment. The asymmetrical flash part 100 also includes a plurality of 64-Kbyte segments 4, 5, . . . N, in which other code or data is stored. Unlike the boot block or boot segment 0, the other segments can be written to so as to update the code or data stored in those segments. As a result, a current BIOS image stored in the asymmetrical flash memory 100 can be updated or flashed with a new image. However, the boot block image in the first segment cannot be updated.

A CPU of a PC accesses the boot block code as follows. The BIOS is stored in a memory, such as an EPROM, located on the motherboard. The EPROM corresponds to the asymmetrical flash part 100 discussed above. The CPU accesses the boot block code directly from the EPROM. When the PC is first powered on or upon resetting of the PC, the power-on sequence causes the CPU to be hardwired to the uppermost 4-Gbyte region of the CPU's address range of the EPROM. For example, for current INTEL processors, upon power on, the CPU starts to execute code at address location $FFFFFFF0_{hex}$, which is near the end of the 4 Gbyte region. Usually, the first instruction at $FFFFFFF0_{hex}$ is a jump to another address in the 4 Gbyte region, where the boot block code resides. As explained previously, the boot block code will perform a check sum or other validation procedure on the BIOS code to determine whether the BIOS code is operable. If it is operable, then the boot block code provides a jump to the BIOS code. If the BIOS code is inoperable (e.g., check sum failed), then the boot block code will execute a recovery process to force the user to write in a new BIOS image, which is flashed into the EPROM.

The boot block code typically goes into a recovery mode for any of the following reasons: a) the check of the BIOS image (e.g., check sum) reveals that the BIOS image is faulty, b) a jumper is placed (by the user) such that the recovery process is initiated, or c) a jumper plug is placed in the parallel port of the PC, again causing the recovery process to be initiated.

FIG. 2 shows a symmetrical flash part or memory 220 that can be used in accordance with the present invention. The symmetrical flash part 220 includes a plurality of equal-sized regions 200-1, 200-2, . . . , 200-N. In the preferred embodiment, each region has a storage capacity of 64 Kbytes. The boot block code, which corresponds to a non-updatable part of a BIOS image, and which has a size of 16 Kbytes, for example, is stored in the first region 200-1. Other code or data, such as an updatable part of the BIOS image, can be stored in the first region 200-1, along with the boot block code. The updatable part of the BIOS image is typically of large enough size so that part of it must also be stored in the second region 200-2. In other words, the updatable part of the BIOS image is typically greater than 48 Kbytes. The method of writing an updated BIOS image according to the present invention is applicable to symmetrical flash parts, and will be described in detail below.

In any flash part, a region is written to by erasing the entire data in the region, and then writing to the region. Thus, for a 64-Kbyte region, the entire 64-Kbyte region is erased, and then updated with the new data. Accordingly, if one desires to update a BIOS image, where part of the BIOS image is stored in a same region as the boot block code, a scheme must be developed which allows the updating of the BIOS image, while protecting the boot block code that is also stored in the same region.

FIG. 3 is a flow chart describing the method according to the present invention. Such a method is applicable to a symmetrical flash part, in which boot block code (say of 16 Kbyte size) is stored in a first region of the flash part, and with a beginning portion (say the first 48 Kbytes) of updatable BIOS code also stored in the first region. For ease in explanation and not by way of limitation, the first region (segment) and all other regions (segments) of the symmetrical flash part have a size of 64 Kbytes. In the example, the remaining portion of the BIOS code is stored in a second region contiguous (in a memory addressable sense) with the first region.

In a first step 300, the entire 64-Kbyte block of the first region, in which the boot block code is stored, is copied to another region, such as, by way of example, the second region, thereby overwriting the contents of the second region. In this example, assume that the first region has a memory address range of from FFFFF000$_{hex}$ to FFFFFFFF$_{hex}$. Further, assume that the second region has a memory address range of from FFFFE000$_{hex}$ to FFFFEFFF$_{hex}$. In the first step 300, the boot block code (non-updatable BIOS image), as well as a portion of the updatable BIOS image, are copied from the first region to the second region of the symmetrical flash part.

In a second step 310, the images of the first and second regions are compared, in order to provide a validation of the copy to the second region. In the preferred embodiment, this comparison is done as a byte-by-byte compare. The second step 310 is made to ensure that the copy to the second region has been made correctly, and thus to ensure that the copy of the boot block code in the second region is exactly the same as the boot block code in the first region.

If the validation has been confirmed, then, in a third step 320, a flag is set to provide an indication that the boot block (first region) is being updated. Such a flag is called a boot-block-in-progress flag in the present invention, and may be a hardware sticky bit or the like. The boot-block-in-progress flag provides an indication that an updating of the BIOS is being performed. Such a flag may be set by way of a bit being set in a latch or flip-flop, for example, whereby if a power failure occurs, that bit would still be in the set state upon power up or reset of the PC. If a reset or power up occurs with the flag being in the set state, the CPU will boot the PC from the backup boot block image in the second region, and not from the boot block image in the first region.

In a fourth step 330, the first region is set to an unprotected state. The first region was in a protected state prior to this step. The setting of the boot block to the unprotected state would not be allowed in conventional memory devices, but is allowed in the symmetrical flash part according to the present invention. That is the system and method according to the present invention allows for the setting of each region, including the boot block or boot region, of the symmetric flash part to either an unprotected or protected state. This setting may be done, for example, by applying a proper voltage (e.g., 5 volts) to an external pin for the symmetrical flash part.

In a fifth step 340, the contents of the first region are erased. One way of erasing the contents of a region of a flash part has been explained previously. Of course, other ways that are known to those skilled in the art may also be utilized.

In a sixth step 350, the contents of the first region are updated with a new image. The new BIOS image may be obtained from a floppy disk loaded into a floppy drive of the PC, for example. The new BIOS image includes both the boot block code that corresponds to the non-updatable BIOS code, as well as the updatable BIOS code.

In a seventh step 360, a comparison is made between the contents of the first and second regions of the symmetrical flash part. In particular, a comparison is made as to whether the contents of the boot block code of the flashed-in image within the first region is exactly the same as the copied boot block code within the second region. This comparison may be done as a byte-by-byte compare, or by checking a check sum value of the boot block image in both the first and second regions, or by other ways known to those skilled in the art to compare data stored in different regions of a memory device.

If the comparison performed in the seventh step 360 results in a match between the boot block codes in the first and second regions, the method proceed to an eighth step 370. If there is not a match, due to a bad writing of the new BIOS image to the first region, for example, the method goes back to the fifth step 340, in which the erasing of the first region and the writing to the first region is tried again. In the present invention, a counter (not shown) may be utilized to count the number of times in which the comparison performed in the seventh step 360 results in a non-match. When the counter reaches a fixed value, say, for example, four, then the method according to the invention would jump to a step in which the boot block image in the second region is written back to the first region, and in which no further rewrites of the first region are allowed. This jump out of the BIOS updating process will occur after several unsuccessful attempts at writing a BIOS image into the symmetric flash part. In such an instance, the user will be informed of the problem by a message provided on the monitor, for example, and will have to take appropriate steps (e.g., obtain another floppy disk containing the flash BIOS) so as to try again at a later point in time.

If the comparison in the seventh step 360 is successful, then the eighth step 370 is performed. In the eighth step 370, the first region is set to the protected state. This may be done, for example, by applying a proper voltage (e.g., 0 volts) to a particular pin of the symmetric flash part.

In a ninth step 380, the boot-block-in-progress flag, which was set in the third step 320, is reset (e.g., to "0"). With the boot-block-in-progress flag reset, the PC will be allowed to boot up from the boot block code in the first region.

In a tenth step 390, the contents of the second region are erased. In an eleventh step 395, the contents of the second region are updated with new data This new data may correspond to the data that was previously stored in the second region prior to the BIOS code updating (if it was properly copied to another section of memory previously), or more likely the updating is performed using the remaining portion of the new BIOS code that has been written into the first region.

As explained earlier, the BIOS code typically is of a size that is more than one 64-Kbyte segment, and so that when the BIOS is updated, the contents of the first and second regions of the symmetric flash part will need to be updated.

Figure 4:
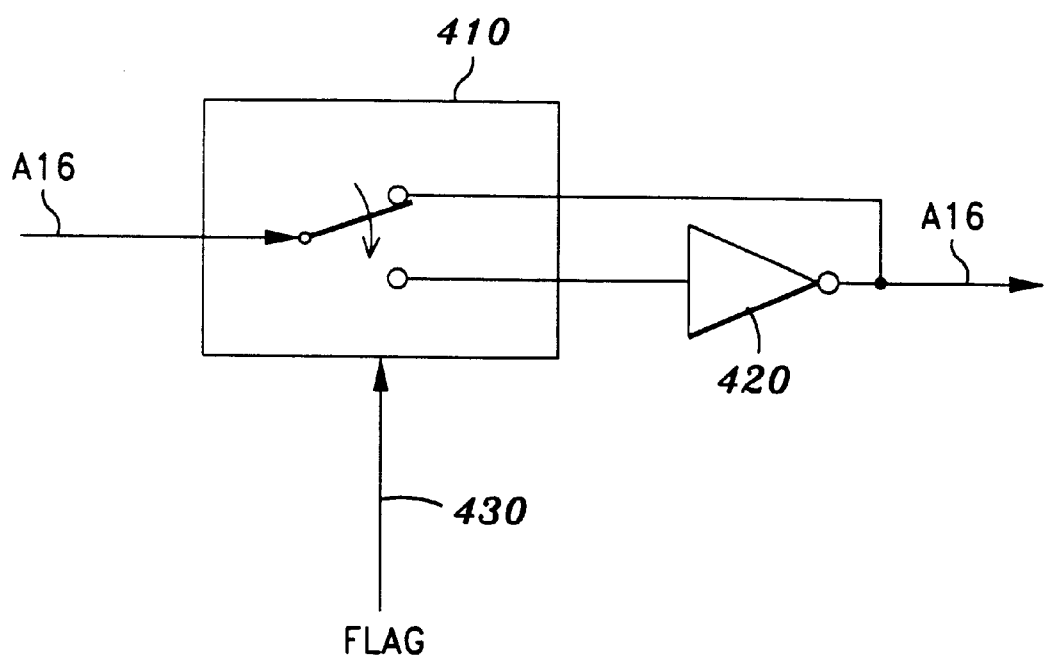
FIG. 4 shows a circuit for reading boot block code from a second region of a symmetrical flash part instead of from a first region, in accordance with the present invention.

In the event that the ninth step 380 has not been completed, due, for example, to a power failure occurring sometime during execution of the third through eighth steps, the boot block code may be unstable or unusable. If this happens, the backup boot block image in the second region is used to recover the contents of the first region. In this situation, the boot-block-in-progress flag is still in the set state upon reboot of the PC. In the preferred embodiment, the PC hardware is configured to provide an address line swap for address line A16, which corresponds to the $16^{th}$-from-the-least-significant address line. For example, for a 32-bit address line, the least significant bit of the address line is designated as A0, the next-to-the-least significant bit of the address line is designated as A1, . . . , and the most significant bit of the address line is designated as A31. If the boot-block-in-progress flag is in a set state when a reboot is being performed, the address line A16 will be inverted so that the boot block code will be retrieved from a physical address region starting from address location $FFFFE0000_{hex}$ (start of second region) rather than from $FFFFF0000_{hex}$ (start of first region). This configuration of the PC hardware can be made such that an inverter is enabled in the address line A16 only when the boot block-in-progress flag is in the set state during a boot operation. FIG. 4 show such a configuration, in which a 2:1 switch 410 is used together with an inverter 420, whereby when the boot-block-in-progress flag value 430 is in a set state during the boot operation, the switch 410 is configured to send the address line A16 through the inverter, but to bypass the inverter 420 when the boot-block-in-program flag value 430 is in a reset state. The boot-block-in-progress flag value 430 is provided to a control input of the switch 410, thereby causing the switch 410 to be in one of its two possible states based on the current state of the boot-block-in-progress flag value 430. An important feature of the boot-block-in-progress flag value 430 is that the value is preserved even when a power down of the PC occurs. That way, when a reboot is performed, boot-block-in-progress flag value 430 is maintained in the same state as existed prior to the power down, and can provide for the correct execution of a booting process based on whether the value is set or reset.

If no hardware exists in the PC to physically cause a change in the booting address, such as by not having the structure of FIG. 4, then the user must be informed to perform a particular procedure if a problem occurs during a BIOS flash operation. In that instance, since the CPU will not automatically perform a reboot from the copied boot block code in the second region, the user must physically do something to cause the CPU to retrieve the uncorrupted boot block code in the second region as opposed to the possibly-corrupted boot block code in the first region. The user normally would be provided with instructions prior to performing the BIOS flash operation, which would warn him or her that in the event of a power failure during the BIOS updating, the user must provide a jumper to a particular location on the motherboard, so as to cause the A16 address line inversion. The instructions may alternatively instruct the user to call a technical support representative, who would provide the necessary instructions to the user so that the user can properly place a jumper (e.g., a wire) in the proper place on place motherboard. With the jumper in place, the CPU will be executing code at a part. which it thinks is the first region, but in fact is the second region of the flash p Once the CPU has rebooted and the BIOS image has been properly written into the first region, then the user can remove the jumper.

Thus, as explained above, if the ninth step has not successfully completed and if the PC hardware does not automatically perform an address line swap based on the boot-block-in-progress flag being in the set state when a boot operation is initiated, then a recovery jumper can be used to swap an address line A16, to thereby relocate the physical address $FFFFE000_{hex}$ to $FFFFF000_{hex}$. The system will then boot using the copied boot block image in the second region, and a recovery process can then take place to rewrite the image in the first region. With the recovery jumper in place, which is physically placed on the motherboard by a user, only updates to the first region can occur as long as the recovery jumper is enabled. As a result, the backup boot block image in the second region is protected until the recovery jumper is removed.

The present invention provides an apparatus and a method to protect the in itegrity of the boot block code such that it is always recoverable in the event that a bad BIOS image or power outage occurs during a BIOS flash or update.

While a preferred embodiment has been described herein, modification of the described embodiment may become apparent to those of ordinary skill in the art, following the teachings of the invention, without departing from the scope of the invention as set forth in the appended claims. For example, while the present invention was described with reference to boot block code has a size of about 16 Kbytes, the present invention is equally applicable to other sizes of boot block code, such as 8 Kbytes or 32 Kbytes, for example, which can be stored in a symmetrical flash part that has equal-sized segments that are larger than the size of the boot block code.

Furthermore while the present invention was described with reference to the copy of the boot block code (and other code in the first region of the flash part) being copied to a neighboring second region of the flash part, that copy may instead be placed in any other particular region of the flash part, such as the tenth 64-Kbyte segment. In that instance, if a failure occurs during the BIOS updating, the CPU would have to retrieve the copied boot block image for a next booting operation from the tenth 64-Kbyte segment of the flash part. Thus, the address line swap would have to be configured to retrieve the boot block code for the CPU from the tenth segment, instead of from the first segment.

What is claimed is:

1. A method of protecting first boot block code and allowing an update to other code or data residing in a same segment or region as the first boot block code, wherein the first boot block code and the other code or data is stored in a first writable segment of a memory that is initially set to a protected non-writable state, the method comprising the steps of:

a) copying all information stored in the first writable segment of the memory into a second writable segment of the memory;

b) validating the copied information in the second writable segment of the memory;

c) setting the first writable segment to a non-protected, writable state;

d) erasing all information stored in the first writable segment;

e) updating the first writable segment with updated code or data, the updated code or data including second boot block code;

f) comparing the second boot block code stored in the first writable segment with the first boot block code stored in the second writable segment;

g) if the comparison in step f) is such that the second and first boot block codes respectively stored in the first and second rewritable segments are identical, setting the first rewritable segment to the protected, non-writable state.

2. The method according to claim 1, her comprising the steps of:

h) between steps b) and c), setting a boot-block-update flag; and i) after the step g), resetting the boot-block-update flag, wherein, if a reboot occurs while the boot-block-update flag is set, the computer is initialized using the first boot block code stored in the second rewritable segment and not from the second boot block code stored in the first rewritable segment.

3. The method according to claim 1, wherein the first and second rewritable segments are segments of a symmetrical flash memory which has only same-sized segments.

4. The method according to claim 1, wherein the first and second rewritable segments are rewritable by erasing all contents of the respective first and second segments, and then writing information to the respective erased first and second segments.

5. The method according to claim 1, wherein the validating step b) is performed by a byte-by-byte compare of information in the first and second segments.

6. The method according to claim 1, wherein the validating step b) is performed by a check sum compare of information in the first and second segments.

7. The method according to claim 1, further comprising the steps of:

h) setting a flag to a set state after the step after the validating step b) has successfully completed, the flag being initially in a reset state; and i) setting the flag to the reset state after the step f) has successfully completed, wherein, if a reboot occurs when the flag is in the reset state, the reboot will occur using the first boot block code stored in the second writable segment and not the second boot block code stored in the first writable segment.

8. The method according to claim 1, wherein the code or data stored with the boot bock code is BIOS code, and wherein the updated code or data is updated BIOS code that replaces the BIOS code.

9. An apparatus for providing protection for boot block code, comprising:

a memory that consists of a plurality of segments including at least two equal sized segments, each of the segments being capable of being erased and rewritten to, wherein the boot block code is stored in a first of the equal sized segments along with other data stored in said first of the equal sized segments, and a copy of at least the boot block code in the first of the equal sized segments to be copied to a second of the equal sized segments, and a processor programmed to compare the boot block code stored in the first of the equal sized segments with the boot block code stored in the second of the equal sized segments to verify that the boot block code stored in the first of the equal sized segments and the boot block code stored in the second of the equal sized segments are identical; if so, said first of the equal sized segments being updated with updated code at least a portion of which includes the boot block code of the second of the equal sized segments.

10. The apparatus of claim 9, wherein the first of the equal sized segments is initially set to a protected, non-writable state and is set to an unprotected, writable state after said processor determines that the boot block code in the first of the equal sized segments is the same as the boot block code stored in the second of the equal sized segments.

11. The apparatus of claim 10, wherein the processor erases all information stored in the first of the equal sized segments after setting said first of the equal sized segments to an unprotected, writable state.

12. The apparatus of claim 11, wherein said processor copies at least said boot block code from the second of the equal sized segments and further copies at least a portion of said other data from a location other than said second of the equal sized segments.

13. A computer program product, comprising a computer usable medium having computer readable program code embodied therein, the computer readable program code in said computer program product comprising:

a) first computer readable code for copying all code and data stored in a first writable segment of the computer usable medium into a second writable segment of the computer usable medium, the copied code and data including first boot block code;

b) second computer readable code for validating the copied code and data in the second writable segment of the computer usable medium;

c) third computer readable code for setting the first writable segment to a non-protected, writable state;

d) fourth computer readable code for erasing all of the code and data stored in the first writable segment;

e) fifth computer readable code for updating the first writable segment with updated code or data, the updated code or data including second boot block code;

f) sixth computer readable code for comparing the first boot block code stored in the first writable segment with the second boot block code stored in the second writable segment, wherein, if the comparison by the sixth computer readable code is such that the second and first boot block codes respectively stored in the first and second rewritable segments are identical, setting the first rewritable segment to the protected, non-writable state.

14. A computer program product according to claim 13, further comprising:

g) seventh computer readable code for setting and for resetting a boot-block-update flag, wherein, if a reboot occurs while the boot-block-update flag is set, the computer is initialized using the first boot block code stored in the second rewritable segment and not from the second boot block code stored in the first rewritable segment.

15. A computer program product according to claim 13, wherein the first and second rewritable segments are segments of a symmetrical flash memory which has only same-sized segments.

16. A computer program product according to claim 13, wherein the first and second rewritable segments are rewritable by erasing all contents of the respective first and second segments, and then writing data to the respective erased first and second segments.

17. A computer program product according to claim 13, wherein the validating by the second computer readable code is performed by a byte-by-byte compare of data in the first and second segments.

18. A computer program product according to claim 13, wherein the validating by the second computer readable code is performed by a check sum compare of data in the first and second segments.

19. A computer program product according to claim 13, wherein the code or data stored with the first boot block code in the step a) is BIOS code, and wherein the updated code or data is updated BIOS code for replacing the BIOS code.

* * * * *